United States Patent [19]

Fletcher

[11] Patent Number: 4,742,523

[45] Date of Patent: May 3, 1988

[54] SEMI-PASSIVE Q-SWITCH

[76] Inventor: Aaron N. Fletcher, P.O. Box 1314, Ridgecrest, Calif. 93555

[21] Appl. No.: 5,972

[22] Filed: Jan. 20, 1987

Related U.S. Application Data

[63] Continuation of Ser. No. 687,799, Dec. 31, 1984.

[51] Int. Cl.$^4$ .............................................. H01S 3/113
[52] U.S. Cl. ........................................ 372/11; 372/54
[58] Field of Search ........................ 372/10, 11, 53, 54

[56] References Cited

U.S. PATENT DOCUMENTS

| | | | |
|---|---|---|---|
| 3,414,836 | 12/1968 | Clark et al. | 331/94.5 |
| 3,493,885 | 2/1970 | Sorokin | 331/94.5 |
| 3,500,234 | 3/1970 | Goedertier | 331/94.5 |
| 3,832,649 | 8/1974 | Feichtner | 331/94.5 L |
| 3,878,478 | 4/1975 | Drexhage | 331/94.5 ML |
| 3,975,694 | 8/1976 | Melamed et al. | 331/94.5 Q |

OTHER PUBLICATIONS

Bakltramiejanti et al; "The Luminescence of Doped Antracene Crystals under Q-Switched Laser Excitation"; Liet. Fiz. Rink (1978) vol. 18(3); pp. 360–364.

Moore et al; "Power-Scaling Effects in Dye Lasers under High-Power Laser Excitation"; J. Appl. Phys. 49(1), Jan. 1978.

Oettinger et al; "Lasing Eff. and Photochem. Stability of IR Laser Dyes in 710–1080 nm Spect. Region"; IEEE JQE, vol. QE-12, No. 2, Feb. 1976.

Berzing et al; "Q Switching of a Laser Based on the Triplet-Triplet Transitions of Organic Molecules"; Opt. Spectroscopy 1967.

Bezrodnyi et al; "A New Passive Q-Switch for $Nd^{3+}$ Lasers"; Sov. Jour. Quant. Elect. 8(1) Jan. 78.

*Primary Examiner*—Léon Scott, Jr.

[57] ABSTRACT

A semi-passive Q-switch can be used at 1.00 to 1.80 micrometers laser radiation, in combination with a laser to give an effective high peak power output.

8 Claims, No Drawings

SEMI-PASSIVE Q-SWITCH

This application is a continuation of application Ser. No. 687,799 filed Dec. 31, 1984.

BACKGROUND OF THE INVENTION

1. Field of the Invention

This invention relates to the field of chemistry. More particularly, this invention relates to saturable absorber materials. Still more particularly but without limitation thereto, this invention relates to a Q-switch for use at 1.00 to 1.80 micrometers, to be used in combination with a laser to give an effective high peak power output.

2. Description of the Prior Art

A Q-switch is used to increase the pulse power of a laser by shortening the output pulse duration. This process allows energy storage within the lasing medium prior to activation of the switch. Saturable absorbers are commonly used to change the Q (quality factor) within a laser cavity. Such materials normally operate using singlet state electronic transitions. A saturable absorber usually affects the modes of the lasing medium.

A saturable absorber is considered to be a passive Q-switch since no external control other than the laser beam itself is used to activate it. A passive device is preferred because of its simplicity since no complicated high voltage electronic timing circuits are involved.

A major disadvantage with the use of most saturable absorbers is their photo-instability. This photo-instability increases for organic dye saturable absorbers (the most common type) whose lowest energy singlet state electronic transition is in the near-infrared. Thermal energy is sufficient to cause a continued small percentage of electronic transitions. Energy-rich electronically excited molecules are usually more chemically reactive than ground state molecules. In addition, the low energy electronic transitions are usually the result of long chain $\pi$-type resonance groups. Such large molecules tend to be insoluble and are difficult to synthesize.

Research has been done in the area of dyes which exhibit a long-lived second triplet state, see J. Faure, L. Grajcar, J. Baudet and G. Berthier, "Triplet-Triplet Absorption Spectra in Cyanine Dyes. Evidence for a Long-Lived Second Triplet State", *IX IUPAC Symposium on Photochemistry*, pp 108–109 (July 25–30, 1982). Since triplet state molecules can be chemically reactive, the choice of the absorber material and the conditions with which it is used would be critical to the expected useful life of the saturable absorber. Such parameters would best be optimized with respect to the intended usage of the saturable absorber.

SUMMARY OF THE INVENTION

An object of this invention is to provide a semi-passive Q-switch for use at 1.00 to 1.80 micrometers.

A further object of the present invention is to provide a semi-passive Q-switch which when used in combination with a laser produces what is considered as eye-safe radiation.

These and other objects are indicated in the present invention wherein a semi-passive Q-switch is used in a laser cavity comprising an organic compound, preferably a polycyclic aromatic, which is capable of absorbing laser light energy when separately excited to the triplet state. Upon absorption at a sufficient rate that up to half of the triplet state molecules are pumped out of the lowest excited triplet state for a portion of molecules in the laser beam, the laser light is transmitted through the Q-switch and the laser medium, giving an effective high peak power output.

DESCRIPTION OF THE PREFERRED EMBODIMENT

This invention uses triplet state saturable absorbers instead of the singlets as have been used in the past for Q-switches. Suitable triplet state molecules are organic compounds such as polycyclic aromatics. Especially suitable are carbocyanine dyes, such as IR 144, having the following structure:

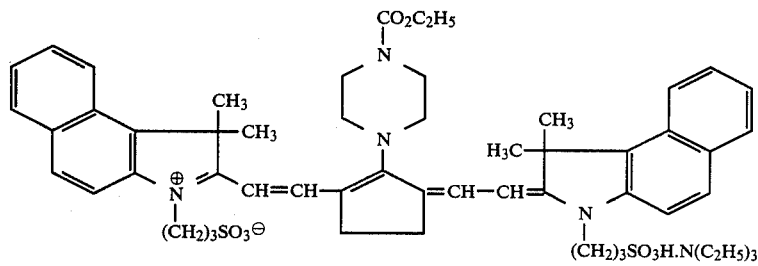

The $S_0 \rightarrow S_1$ (ground to excited singlet level) transitions used in singlet saturable absorbers typically involve much more energy than the $T_1 \rightarrow T_2$ (first to second triplet level) transitions of this invention. The $T_1 \rightarrow T_2$ transitions are consequently found at longer wavelengths than for the singlet states.

A light source is used for the $S_0 \rightarrow S_1$ initial transition. Control or variation in the intensity of the light source for the $S_0 \rightarrow S_1$ transition results in the final device being an active passive system i.e. semi-passive. The light source could be an electrical discharge lamp, such as a mercury lamp or light from the source used to excite the lasing medium, such as might be provided via light pipes or from a laser rod serving as a light pipe. A tungsten filament light source may also have the required intensity where sufficient time is available to build up the concentration of $T_1$. Where appropriate, light from a separate laser may be used for initial experimentation.

The flashlamp energy may be filtered so as to control the energy levels involved. The laser light bleaches the triplet by electronic transition to an upper state. The Q-switch material is preferably deployed in either liquid or solid state but may be gaseous. Bleaching of the triplet allows transmittance of light from the laser active element to the laser mirror resulting in formation of laser light pulses. Sensitizer molecules may also formation of laser light pulses. Sensitizer molecules may also be added to the material used for the Q-switch to aid in the $S_1 \rightarrow T_1$ transition.

The technical features of this invention involves pumping the dye from the singlet state to the triplet state and making use of triplet-triplet absorption at the lasing wavelength to control the Q of the cavity.

It is preferable to supply all of the Q-switch pump energy a few microseconds prior to the initiation of the laser flashlamp. In practice, this energy may coincide with the energy produced by the flashlamp that is pumping the laser. The triplet is required to revert back to the singlet before the initiation of the second laser pulse.

The dye used should have a high triplet quantum yield, preferably a yield near 1.0 where each photon absorbed yields a triplet state molecule. Dyes with low triplet quantum yields can be used however, in conjunction with a second chemical called a sensitizer, that has a high triplet quantum yield and has a triplet state at a higher energy level from the triplet state of the Q-switch dye. By transferring the energy of the sensitizer dye to the Q-switch dye, the triplet state of the Q-switch dye can be rapidly formed. Suitable sensitizer dyes are anthracene and tetracene when used with the dye IR 144. In the preferred embodiment the dye has a triplet-triplet molar absorption of at least $10^4$ liter cm/mole at the lasing wavelength.

The dye must be soluble in the matrix and have negligible photo-instability. Also, the relaxation time for the triplet-triplet absorption must be suitable for the action of the Q-switch.

The dye matrix can be a solution or a solid but it must have negligible absorption at the lasing wavelength. The matrix must be chemically stable and not degrade under the conditions of a high flux of the Q-switch pump. A critical consideration is that the matrix should not quench the triplet state of the dye faster than is desired. It must also dissolve the dye and the sensitizer, if one is used.

The Q-switch pump must be efficient in the conversion of electricity to light at wavelengths needed to pump the dye. The pump must also be able to rapidly convert the dye from the singlet to the triplet state prior to the activation of the laser pump.

In order to save on the power requirements of the pump source, the matrix may be made of plastics, low melting inorganic glasses or very viscous liquids in order to give a sufficiently long triplet life to the dye. The greatest flexibility is in the use of molecules in solution. However, solutions in turn yield the shortest lifetime for a triplet state molecule. Best control of the saturable characteristics is obtained where the light source/sensitizer/primary molecule/quencher relationship gives a controlled concentration of $T_1$.

The preferred embodiment contemplates a small size as a basic requirement. Therefore, the Q-switch and the laser rod are pumped at the same time by the same flashlamp.

Alternately, a separate pumping flashlamp or semiconductor laser may be used to activate the Q-switch. However this results in increased complexity and increased power requirements. If the operational lifetime of the Q-switch material is sufficient, i.e. photochemically stable, the Q-switch can be used in an active mode. Variation in the Q-switch pump source can be used to control the intensity of absorption at the lasing wavelength. This mode demands greater electrical power and photostability of the Q-switch than the semi-passive mode.

The Q-switch must be pumped on its face rather than from its side. This is particularly necessary if a solid matrix is used since the orientation of molecules determines whether they will absorb light. For this invention, the Q-switch may be pumped from the mirror side by the use of a dichroic mirror that reflects laser light but transmits lower wavelengths. If only the laser flashlamp is to be used, pumping is best performed from the rod side of the Q-switch. The reflective cavity may also be extended along its length so that the Q-switch can serve as a non-reflective end-plate to the pump cavity. In this way, more pumped light is transferred to the Q-switch.

The optical power needed to activate the semi-passive Q-switch can be calculated by the following equation:

$$I = \frac{1.2 \times 10^2 A}{q \times \lambda \times \epsilon \times \phi \times t} \text{ watts/cm}^2$$

where I is the optical intensity in watts-cm$^{-2}$ absorbed at wavelength $\lambda$ in $\mu$m at an efficiciency of q. The value q is the ratio of photons of I absorbed, divided by the number striking the q-switch. The value of the molar absorptivity of the material giving rise to the absorbance A, $\epsilon$ is expressed in liter-cm$^{-1}$-mole$^{-1}$ and $\Phi$ is the quantum efficiency of conversion to the absorbing form for those photons that were absorbed in time t in seconds.

Thus, for complete absorption at 0.5 $\mu$m in 10 $\mu$s, a triplet material having a molar absorptivity of $10^4$ has an absorbance of 1 if its quantum yield for triplet conversion is 1.0 and the intensity of the Q-switch pump is $2.4 \times 10^3$ watts/cm$^2$. This calculation is based upon the assumption that the triplet lifetime is long compared to the pump time so that triplet decay is negligible. In terms of energy rather than power, 24 mJ per square cm must be absorbed by the Q-switch to activate it to an absorbance of 1. Thus, the dye laser which readily delivers a 50 mJ pulse, can serve to trigger a semi-passive Q-switch. A cw discharge lamp requires a power of 24 mWcm$^{-2}$ to be absorbed by the Q-switch for activation. The cw lamp of this intensity is applicable only if the triplet lifetime is on the order of 10 seconds with negligible phosphorescence.

The above mentioned calculations are made with a material with a molar absorptivity of $10^4$ cm$^{-1}$. Values of molar absorptivity of $10^5$ are known, for example, the dye rhodamine 6G. An absorbance of $10^5$ at the lasing wavelength rather than $10^4$ would require only one tenth of the energy or power calculated above.

This invention has been described in detail with particular reference to certain preferred embodiments thereof, but it will be understood that variations and modifications can be effected within the spirit and scope of the invention.

What is claimed is:

1. In a modified Q-switch laser apparatus for generating an effective high peak power output of laser light energy having:
   an optical cavity formed by an active lasing medium means and two reflecting elements on either side of said means, said lasing means positioned within said cavity for the production of laser light emission during population inversion thereof, said laser light emission having a wavelength of 1.00 to 1.80 micrometers, and a first pumping energy source coupled to said lasing means for stimulating the population inversion thereof, the improvement comprising:
- a light control means interposed between said lasing means and one of said reflecting elements to control said laser light emission, said light control means being a solution of an aromatic polycyclic compound; and
- a second pumping energy source coupled to said light control means for exciting the polycyclic aromatic compound from singlet states to triplet states such that when said polycyclic aromatic compound is in the triplet state it absorbs laser light energy of 1.00 to 1.80 micrometers wavelength in the transitions from a first triplet state to a second triplet state until saturation of triplet-triplet absorption occurs, allowing the transmission of laser light energy through said light control means.

2. The apparatus defined in claim 1 wherein said polycyclic aromatic compound is a carbocyanine dye having the following structure:

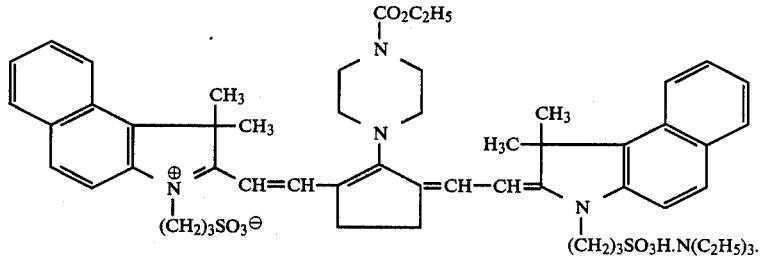

3. The apparatus defined in claim 2 further comprising a sensitizer selected from the group consisting of anthracene and tetracene, said sensitizer used in conjunction with said polycyclic aromatic compound to produce a high triplet quantum yield.

4. The apparatus defined in claim 1 wherein said second pumping energy source coupled to said light control means to activate said polycyclic organic compound to the triplet state is a mercury flashlamp.

5. The apparatus defined in claim 1 wherein said second pumping energy source coupled to said light control means to activate said polycyclic organic compound to the triplet state is a laser.

6. A method for generating an effective high peak power output of laser light emission using a semi-passive Q-switch apparatus having:

an optical cavity formed by an active lasing medium means and two reflecting elements on either side of said means, said lasing means positioned within said cavity for the production of laser light emissions during population inversion thereof;

a first pumping energy source coupled to said lasing means;

a light control means interposed between said lasing means and one of said reflecting elements to control said laser emission, said light control means being a solution of an aromatic polycyclic compound; and a second pumping energy source coupled to said light control means;

said method comprising the steps of
- pumping said light control means with said second pumping energy source to excite said polycyclic aromatic compound from singlet states to triplet states such that when said polycyclic aromatic compound is in the triplet state it absorbs laser light energy of 1.00 to 1.80 micrometer wavelength in the transitions from a first triplet state to a second triplet state;
- pumping said lasing means with said first pumping energy source to obtain a stimulated laser emission having a wavelength of 1.00 to 1.80 micrometers; and
- controlling said stimulated emission with said light control means until saturation of triplet-triplet absorption occurs, allowing transmission of laser light energy through said light control means.

7. The method of claim 6 wherein said polycyclic aromatic compound to produce a high triplet quantum yield is a carbocyanine dye having the following structure:

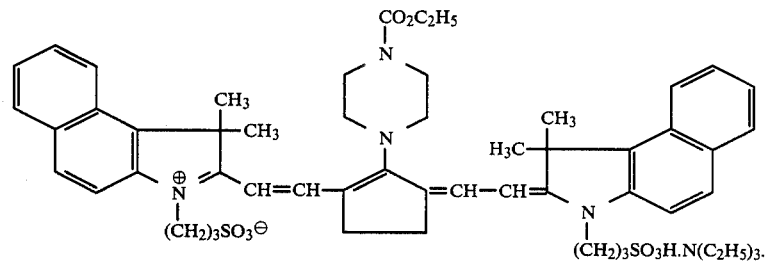

8. The method of claim 6 wherein a sensitizer selected from the group consisting of anthracene and tetracene is used in conjunction with said polycyclic aromatic compound.

* * * * *